May 12, 1931. W. I. JONES 1,805,462
FASTENER ASSEMBLY
Filed Oct. 4, 1929
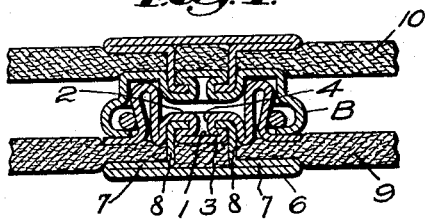
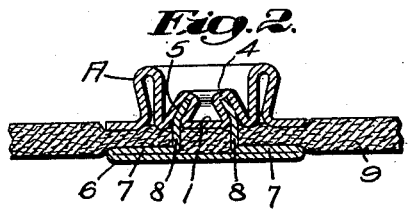
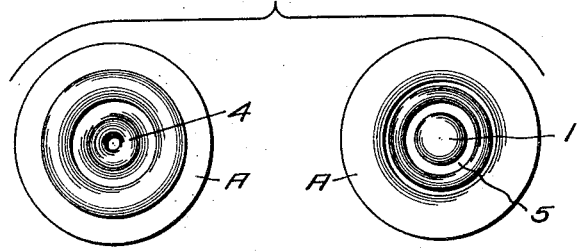
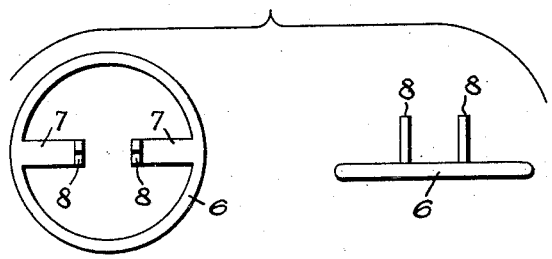
Inventor:
Walter I. Jones;
by Emery, Booth, Varney & Townsend
Attys Patented May 12, 1931

1,805,462

UNITED STATES PATENT OFFICE

WALTER I. JONES, OF ARLINGTON, MASSACHUSETTS, ASSIGNOR TO UNITED-CARR FASTENER CORPORATION, OF CAMBRIDGE, MASSACHUSETTS, A CORPORATION OF MASSACHUSETTS

FASTENER ASSEMBLY

Application filed October 4, 1929. Serial No. 397,401.

My invention aims to provide improvements in fastener assemblies.

In the drawings, which illustrate a preferred embodiment of my invention:

Figure 1 is a longitudinal section through a snap fastener assembly showing my improved form of attachment;

Fig. 2 is a section through the stud installation shown in Fig. 1, but showing the relation of parts during the initial operation of assembly;

Fig. 3 includes a top and a bottom view of the stud member; and

Fig. 4 includes a plan and a side elevation of the attaching part.

Referring now to the embodiment of my invention illustrated by the drawings, I have shown a well known type of socket and stud secured to their respective carrying mediums by using substantially the same type elements and method of attachment in each instance. It should be understood that any other suitable fastener member, whether it is a stud, socket or button, may be secured to its carrying medium in substantially the same manner and by the same method as will be hereinafter described.

A description of my invention with relation to the stud A illustrated will serve to explain my invention to those skilled in the art. The cup-shaped central portion of the stud has a bottom 1 from the material of which is pressed a pair of walls 2 and 3 connected by a web 4 to provide an annular groove 5. Prior to attachment and at the point of manufacture the walls 2 and 3 of the stud are arranged, as shown in Fig. 2.

While any suitable attaching means may be used, I prefer to provide an attaching part 6 pressed from sheet metal and having two arms 7, 7 extending toward the center with prongs 8, 8 extending at right angles to the arms, as shown in Fig. 4.

To secure the parts of the stud assembly together, I use suitable die members (not shown) to hold the stud A and the attaching member 6. In the drawings (Fig. 2) I have shown the prongs 8, 8 of the attaching part passing through a flexible carrying medium 9, of cloth, leather or the like, and engaged in the groove 5 of the stud located at the opposite side of the carrying medium. During the entrance of the prongs 8, 8 into the groove 5, they contact with the inwardly sloping wall 2 and are bent inwardly between the walls 2 and 3 as illustrated in Fig. 2. Thereafter the prongs 8, 8 and walls 2 and 3 are collapsed or clenched downwardly toward the bottom 1 of the cup-shaped portion as shown in Fig. 1. This final clenching operation upsets the walls and prongs so that it is impossible for the prongs 8, 8 to be withdrawn when the parts are subjected to normal strains and stresses. Therefore, I have provided a novel means and method of attachment which is strong and durable. The method of attachment is simple and the carrying medium remains intact except for the slight perforations made by the prongs 8, 8. These perforations are at points remote from the edges of the stud and the attaching part and therefore no frayed material can show even when the carrying medium is under lateral tension.

The socket B is secured to the carrying medium 10 by the same means and method as described in connection with the stud and needs no further description.

While I have illustrated and described a preferred embodiment of my invention, I do not wish to be limited thereby because the scope of my invention is best defined in the following claims.

Claims:

1. A fastener installation comprising, in combination, a carrying medium, a fastener part located at one side of the carrying medium and having collapsible means providing an annular groove located adjacent to the carrying medium and an attaching part located at the opposite side of the carrying medium and having means passing through the carrying medium and clenched within the annular groove presented by the snap fastener part and said means being further clenched when said collapsible means is flattened toward the said carrying medium.

2. A fastener installation comprising, in combination, a carrying medium, a fastener part located at one side of the carrying medium and having a cup-shaped portion provided with an annular groove in the bottom thereof surrounded by annular collapsible walls, and an attaching part located at the opposite side of the carrying medium and having prongs passing through the carrying medium and into the groove to secure the parts of the assembly together and said prongs being upset and clenched between said collapsible walls when said walls are flattened toward said carrying medium.

3. A fastener member having a cup-shaped portion provided with a bottom 1, a pair of walls 2 and 3 pressed from the material of said bottom 1 and extending at an angle of less than 90° with relation to said bottom and said walls being spaced apart to provide an annular groove 5 into which the attaching means of an attaching part may be forced to secure the fastener member to a support and said walls 2 and 3 being collapsible toward the said bottom 1 to clench the attaching means between them and thereby secure the fastener member to a support.

In testimony whereof, I have signed my name to this specification.

WALTER I. JONES.